United States Patent
Huber et al.

(10) Patent No.: US 9,656,204 B2
(45) Date of Patent: May 23, 2017

(54) METHOD FOR OBTAINING HYDROGEN, AND CORRESPONDING DEVICE

(71) Applicant: Mahnken & Partner GmbH, Ahausen (DE)

(72) Inventors: Anna Huber, Soerup (DE); Hinrich Lorenzen, Soerup (DE); Claus-Lueder Mahnken, Ahausen (DE); Siegfried Reck, Nienburg (DE); Sebastian Rosskamp, Stade (DE); Dieter Thiesen, Struxdorf (DE)

(73) Assignee: Mahnken & Partner GmbH, Ahausen (DE)

( * ) Notice: Subject to any disclaimer, the term of this patent is extended or adjusted under 35 U.S.C. 154(b) by 0 days.

(21) Appl. No.: 14/430,773

(22) PCT Filed: Sep. 27, 2013

(86) PCT No.: PCT/EP2013/070179
§ 371 (c)(1),
(2) Date: Mar. 24, 2015

(87) PCT Pub. No.: WO2014/049115
PCT Pub. Date: Apr. 3, 2014

(65) Prior Publication Data
US 2015/0246311 A1   Sep. 3, 2015

(30) Foreign Application Priority Data

Sep. 27, 2012   (DE) .......................... 10 2012 109 154

(51) Int. Cl.
*B01D 53/22* (2006.01)
*B01D 63/00* (2006.01)
(Continued)

(52) U.S. Cl.
CPC ........... *B01D 53/228* (2013.01); *B01D 53/22* (2013.01); *B01D 63/00* (2013.01); *B01D 69/02* (2013.01);
(Continued)

(58) Field of Classification Search
CPC   B01D 53/22; B01D 53/228; B01D 2053/221; B01D 63/00; B01D 69/02;
(Continued)

(56) References Cited

U.S. PATENT DOCUMENTS

| | | |
|---|---|---|
| 2,962,123 A | 11/1960 | Darling |
| 3,279,154 A | 10/1966 | Emerson et al. |

(Continued)

FOREIGN PATENT DOCUMENTS

| | | | | |
|---|---|---|---|---|
| DE | 2823521 | * | 5/1978 | ............... C01B 1/27 |
| DE | 102010049792 A1 | * | 5/2011 | ............... C10K 3/00 |

(Continued)

OTHER PUBLICATIONS

English Language Machine Translation of DE 2823521. Retrieved from http://worldwide.espacenet.com on Jun. 7, 2016.*

(Continued)

*Primary Examiner* — Jason M Greene
(74) *Attorney, Agent, or Firm* — Whitham, Curtis & Cook, P.C.

(57) ABSTRACT

A method for obtaining highly pure hydrogen from a raw gas begins with heating and/or treating a semipermeable material made of metal or a metal alloy, preferably, conducting an electric current through the semipermeable material at the beginning of the method in order to increase the quantity of hydrogen passing through the material. A device for obtaining highly pure hydrogen from the raw gas includes a semipermeable material which forms a boundary between the interior of a pressure vessel and the outer region of the (Continued)

Figure 1:
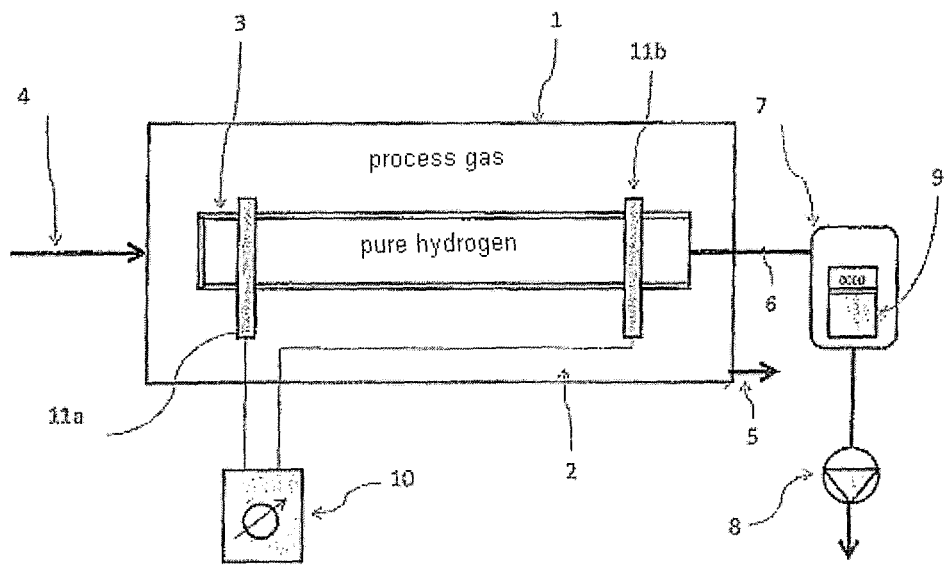

pressure vessel and which is permeable to hydrogen. The device is designed such that is can be heatable or treatable at least in sections, in particular, by means of electric energy.

14 Claims, 2 Drawing Sheets

(51) Int. Cl.
  *B01D 69/02* (2006.01)
  *B01D 71/02* (2006.01)
  *C01B 3/50* (2006.01)
(52) U.S. Cl.
  CPC ............ *B01D 71/022* (2013.01); *C01B 3/501* (2013.01); *C01B 3/503* (2013.01); *B01D 2053/221* (2013.01); *B01D 2256/16* (2013.01); *B01D 2313/22* (2013.01); *B01D 2325/20* (2013.01); *C01B 2203/0405* (2013.01)
(58) Field of Classification Search
  CPC ...... B01D 69/04; B01D 69/06; B01D 71/022; B01D 2256/16; B01D 2257/108; B01D 2313/22; C01B 3/501; C01B 3/503; C01B 3/505
  USPC ........................................................ 95/55, 56
  See application file for complete search history.

(56) References Cited

U.S. PATENT DOCUMENTS

| | | | | |
|---|---|---|---|---|
| 3,350,846 | A * | 11/1967 | Makrides | ................ C01B 3/505 95/56 |
| 3,392,510 | A | 7/1968 | Koch | |
| 3,972,695 | A | 8/1976 | Buckley et al. | |
| 4,468,235 | A | 8/1984 | Hill | |
| 4,810,485 | A | 3/1989 | Marianowski et al. | |
| 5,089,122 | A * | 2/1992 | Chmiel | .................. B01D 69/10 210/185 |
| 6,896,717 | B2 * | 5/2005 | Pinnau | .................. B01D 53/228 95/45 |
| 7,396,384 | B2 * | 7/2008 | Barker | ................ H01M 8/0206 429/410 |
| 8,313,556 | B2 * | 11/2012 | McAlister | ............... F02B 43/08 423/580.1 |
| 2006/0016332 | A1 | 1/2006 | Ma et al. | |
| 2007/0023401 | A1 * | 2/2007 | Tsukamoto | .......... B23K 11/002 219/86.22 |
| 2007/0240566 | A1 * | 10/2007 | Benn | .................... B01D 71/022 95/56 |
| 2008/0210088 | A1 * | 9/2008 | Pledger | ................ B01D 53/228 95/56 |
| 2010/0005960 | A1 * | 1/2010 | Noda | ...................... C01B 3/501 95/56 |
| 2011/0041694 | A1 * | 2/2011 | Riess | ..................... B01D 53/22 96/221 |

FOREIGN PATENT DOCUMENTS

| | | | |
|---|---|---|---|
| JP | 08257376 | 10/1996 | |
| JP | 2000140584 | 5/2000 | |
| JP | 2002128505 | 5/2002 | |
| WO | WO 2011/158275 A1 * | 12/2011 | ............... C01B 3/50 |

OTHER PUBLICATIONS

English Language Machine Translation of DE 102010049792. Retrieved from http://worldwide.espacenet.com on Jun. 8, 2016.*
Donglai et al., "Permeation Efficiency of PdAg Membrane Modules with Porous Stainless Steel Substrates", Separation and Purification Technology, vol. 89, Jan. 12, 2012, p. 189-192.

* cited by examiner

METHOD FOR OBTAINING HYDROGEN, AND CORRESPONDING DEVICE

The present invention relates in a first aspect to a method for obtaining high-purity hydrogen from a raw gas. Said method comprises a semipermeable material composed of a metal or metal alloy being heated/treated at the start of the method, preferably by passing an electric current through the semipermeable material at the start of the method, in order to increase the amount of permeating hydrogen. There is further provided a device for obtaining high-purity hydrogen from raw gas, this device comprising a semipermeable material which is pervious to hydrogen and which in the interior of a pressure vessel delimits in the inner region from the outer region of the pressure vessel, wherein this device is engineered such that the semipermeable material is at least segmentally heatable/treatable, especially by electric energy, for at least a selected period.

PRIOR ART

Purified hydrogen gas is used in various industrial sectors. Hydrogen is separable for instance from pyrolysis gas from, for example, renewable raw materials. Carbon monoxide, carbon dioxide and methane are further components of pyrolysis gases.

A wide variety of devices and methods are known for obtaining pure or at least substantially pure hydrogen by partitioning hydrogen from other gases or gas mixtures by liquefaction at high pressure and very low temperature. However, this is extremely inconvenient and costly. Nor are these devices/methods capable of generating high-purity hydrogen, since other gases and/or extraneous materials also remain in the then liquid hydrogen phase.

It has further been proposed to separate off the hydrogen by means of semipermeable material, such as semipermeable dividing walls which are hydrogen pervious.

Methods employing semipermeable materials are known for example from DE 28 23 521. DE 33 19 305 also describes corresponding methods for concentrating and separating hydrogen from a gas mixture by employing porous materials. Glass has been described as an example of a suitable porous material. Palladium-containing materials have further been mentioned as examples of suitable materials. Permanent heating of palladium-containing materials has been described for example. DE 600 20 772 T2 discloses a method for separating hydrogen from a hydrogen-containing gas mixture by means of a conductive membrane composed of an oxide of the perovskite type.

DE 10 2010 049 792 describes a small-scale power plant containing a device for segregating high-purity hydrogen from a pyrolysis gas, said device comprising a housing surrounding an interior and having at least one semipermeable dividing wall arranged in the housing and separating off a region at least partially filled with pyrolysis gas. High-purity hydrogen is segregatable from the pyrolysis gas through this dividing wall. The document in question further proposes a method for segregating high-purity hydrogen by means of a semipermeable dividing wall. Pig iron is an example of the ferritic iron proposed as suitable material for the semipermeable dividing wall. What is described more particularly in the document in question is that the semipermeable dividing wall is, for example, in the form of iron tubes surrounded by an electroconductor in order, for example, to provide a magnetic field that is to promote the diffusion of hydrogen. It is further stated to be preferable for pyrolysis gas to be supplied in the heated state of above 400° C.

However, it is costly to permanently electrify the dividing wall and to permanently heat the pyrolysis gas. It is known from theory that the diffusion constant of iron increases exponentially with temperature and that, therefore, higher diffusion rates for hydrogen are attained at higher temperatures.

It is an object of the present invention to provide a method and a device for inexpensively separating hydrogen gas from, for example, pyrolysis gas or other primary gases.

DESCRIPTION OF THE INVENTION

It has now been found that, surprisingly, the diffusion of hydrogen from primary gas through a semipermeable material is simple to amplify by heating/treating the semipermeable material for a short period at least, in that, once the diffusion has started, these heating measures are no longer necessary and at least interruptable in that the diffusion of the hydrogen through the semipermeable material continues unassisted.

A first aspect of the present invention is accordingly directed to a method for obtaining high-purity hydrogen from a raw gas, wherein the raw gas is passed under pressure into a first pressure vessel and this first pressure vessel is at least partially delimited from a second pressure vessel by a semipermeable material, wherein the first pressure vessel is completely self-contained relative to the second pressure vessel and wherein the high-purity hydrogen segregates through this semipermeable material into the second pressure vessel, characterized in that the semipermeable material is a metal or metal alloy and this semipermeable material is heated at the start of the method at least, and this heating is at least interrupted after an increase in the amount of hydrogen permeating through this semipermeable material.

In one embodiment, the first pressure vessel has an inner region which is completely self-contained relative to the interior of the first pressure vessel and which is at least partially, for example completely, delimited from the interior of the first pressure vessel by a semipermeable material, and the high-purity hydrogen segregates via this semipermeable material into the inner region. In the method, the semipermeable material is a metal or metal alloy and is heated at the start of the method at least. This heating is effected for a period sufficient to increase the amount of hydrogen permeating through this semipermeable material.

It surprisingly transpired that temporal or segmental heating/treating of the semipermeable material increases the diffusion of the hydrogen through this semipermeable material and that, after ending any energy supply for heating the material, the diffusion of the hydrogen through the semipermeable material takes place at an increased rate. As a result, the invention makes it possible to carry out the segregation of the hydrogen in an economical manner, viz., without permanent supply of energy to permanently heat the semipermeable material or else the raw gas.

"Heating the material" is herein to be understood as meaning that energy in the form of electric energy and/or thermal energy is supplied to the semipermeable material. The "heating" or "treating" of the material may thus be effected through various measures, preferably by electric energy. The "heating" or "treatment" leads to an increase in the perviousness of the material to hydrogen.

The expression "semipermeable material" is herein to be understood as meaning that this material is suitable for segregating hydrogen because other gases are unable to permeate through this material.

In one preferred embodiment, the semipermeable material is a semipermeable material comprising ferritic iron and/or pig iron and/or ingot iron, preferably consisting of ferritic iron and/or pig iron and/or ingot iron. The use of ingot iron is preferred, while the iron content of the ingot iron is preferably more than 99.8%. A high iron content is advantageous for hydrogen permeation through the semipermeable material while other gases present in the primary and/or raw gas are retained.

It is believed in this connection that molecular hydrogen dissociates into atomic hydrogen on the outer surface of the iron tube. This atomic hydrogen is initially adsorbed. It is believed in this connection that the proton is separated from the electron and that the proton is correspondingly able to diffuse through the iron only to reassociate into atomic hydrogen and then into molecular hydrogen on the inner surfaces of the iron tube.

It was surprisingly possible for the hydrogen throughput to be increased by briefly heating/treating the semipermeable material, for example in the shape of a tube, for example by applying electric energy, and to be maintained at a high level without requiring any continued supply of energy. This can reduce the energy requirements of heating the tube substantially, which greatly reduces the costs of obtaining high-purity hydrogen.

It is preferable in this connection for the current to be applied as an alternating current directly to the semipermeable material, e.g., the electric current is applied directly to the metal tube. The current density is preferably above 10 amperes per square millimeter, e.g., 20 amperes per square millimeter or greater.

The expression "briefly" is to be understood herein as meaning that heating or treating is effected for a period which increases the perviousness of the semipermeable material to hydrogen. Subsequently, the heating or treating is ended or interrupted. This brief heating/treating is effected at the commencement of the process and is repeated as necessary, for example when the diffusion rate decreases.

It is therefore particularly preferable to only heat the semipermeable material at the start of the method, for a period sufficient to increase the amount of permeating hydrogen. Alternatively, the heating, for example by means of current, such as alternating current, may be effected in a pulsating manner. The expression "pulsating" is herein to be understood as meaning that the current is applied for a period and, after the current has been interrupted, is switched on again. The period during which the current is applied may be individually adjusted.

Such heating takes place at least segmentally. This segmental heating may be effected via the supply of heat. Preferably, however, an at least segmental heating of the semipermeable membrane is effected by means of electric energy. It is therefore preferable to heat the semipermeable material by means of current, in particular alternating electric current. This electric current is preferably applied in longitudinal direction and not by coiling a conductor around the semipermeable material.

The current used may be a customary alternating current having a frequency of 50 hertz, but alternatively it is also possible to use direct current, for example pulsating direct current. The throughput of hydrogen through the semipermeable material rises as soon as current is applied to the latter.

It transpired in this connection that the hydrogen throughput is exponentially dependent on the current strength applied. It is preferable for the current density to be for example at least 10 amperes per square millimeter, e.g., at least 20 amperes per square millimeter.

In contradistinction to the previous belief that continuous heating of the semipermeable material is necessary and further to the belief that heating the raw gas to above 400° C. is necessary, the present inventors determined that initial heating is sufficient to increase the diffusion of the hydrogen through the semipermeable material. The diffusion rate then stays at a high level without any need for further supply of energy, whether as heat or as electric energy. The semipermeable material, such as the metal, may be subjected to annealing before the start of the method. This annealing can be achieved using heat or current.

The heating is preferably a soft-annealing of the metal or metal alloy, preferably an at least brief heating to a temperature of 400° C. to 800° C. The heating is preferably achieved using electric energy, for example by applying alternating electric current. It is particularly preferable in this connection for a high current strength to be applied, since it has emerged herein that the hydrogen throughput is exponentially dependent on the current strength applied.

It further transpired that the throughput of hydrogen through the semipermeable material can be distinctly increased by initial application of electric current versus a purely temperature increase, for example from the supply of thermal energy.

In a further preferred embodiment, the raw gas passes under pressure into the pressure vessel while in the interior of the inner region, where the hydrogen is segregated, this segregated hydrogen is conducted away by negative pressure.

The raw gas may contain a carrier gas, such as an inert gas, e.g., $CO_2$, but also light hydrocarbons, e.g., methane ($CH_4$).

The raw gas imported into the pressure vessel may have an elevated temperature at the time of its introduction, but it is preferable to introduce the raw gas into the pressure vessel at a temperature below 400° C., such as below 300° C., especially below 200° C., such as below 100° C., in particular at room temperature. That is, there is no need in this invention to heat the raw gas in advance in order possibly also to heat the semipermeable material. On the contrary, in one preferred embodiment, the raw gas feed is not heated.

The method may further comprise a step of removing, for example flushing, the segregated hydrogen off the semipermeable material in order to reduce the local concentration of hydrogen and maintain the segregation rate at a high level.

In one embodiment here, the raw gas passes under pressure into the inner region. This inner region is at least partially delimited from the interior of the first pressure vessel by the semipermeable material. The high-purity hydrogen can be segregated via this semipermeable material into the interior of the first pressure vessel and be withdrawn by means of negative pressure for example.

The present invention further provides a device for obtaining high-purity hydrogen from raw gas with a first pressure vessel and incoming and outgoing lines for the raw gas and, respectively, the hydrogen-depleted raw gas, a second pressure vessel, which is completely self-contained relative to the first pressure vessel, and this second pressure vessel is at least partially delimited from the first pressure vessel by a semipermeable material, wherein this semipermeable material is pervious to hydrogen, for segregating high-purity hydrogen from the raw gas, characterized in that the semipermeable material is heatable, especially by electric energy, at least segmentally, in particular as adapted for performing the method according to the present invention.

In one embodiment, the present invention provides a device for obtaining high-purity hydrogen from raw gas with a pressure vessel and incoming and outgoing lines for the raw gas and, respectively, the hydrogen-depleted raw gas, an inner region in the interior of the pressure vessel, said inner region being completely self-contained relative to the interior of the pressure vessel, and being at least partially delimited from the interior of the pressure vessel by a semipermeable membrane, wherein this semipermeable membrane is pervious to hydrogen, for segregating high-purity hydrogen from the raw gas, characterized in that the semipermeable material is heatable/treatable, especially by electric energy, at least segmentally, and the device is adapted such that the heating/treatment is effected briefly, at the start of the process at least.

The device is in particular a device wherein the semipermeable material is a semipermeable material containing ferritic iron and/or pig iron and/or ingot iron, in particular a semipermeable material consisting thereof.

The device according to the present invention may comprise appropriate means for generating positive and negative pressure.

The semipermeable material is preferably fabricated as tube, in which case two or more, preferably identical, tubes comprising the semipermeable material may preferably be present within the pressure vessel. This makes it possible to achieve a compact design for the device of the present invention. A corresponding design of the semipermeable material in the form of tubes provides an enlarged surface area, and so more hydrogen can be segregated. Appropriate distributors may be arranged inside or outside the pressure vessel to distribute the raw gas and/or bring together the depleted raw gas or the segregated hydrogen. Such distributors and/or corresponding valve arrangements are preferably arranged within the pressure vessel in order that only one inlet and outlet are present in each case.

The wall thickness of the semipermeable material in the form of tubes, for example, may differ in various segments. This may lead to enhanced diffusion of hydrogen through the semipermeable material.

The semipermeable material is appropriately fitted with electric contacts which are connected to a source of current. These electric contacts make it possible to apply electric energy to the semipermeable material in order to heat the latter at the start at least. Such electrification may take the form of alternating current or direct current for example. The electric current is applied in the longitudinal direction of the, for example, tubular semipermeable material. In particular, the device comprises an open or closed loop control unit whereby the application of current, in particular alternating current, to the semipermeable material is controlled in an open or closed loop manner, for example as a pulsating supply of current, etc.

The device of the present invention may further include an appropriate outlet for the hydrogen and optionally a vessel for collecting same.

The device of the present invention may further be designed to include customary facilities, for example gas scrubbers etc., in order to ready the raw gas and/or further process the segregated hydrogen.

A compressor or pump may be provided to establish the positive pressure for the raw gas—also known as process gas. To withdraw the segregated pure hydrogen, a vacuum pump may correspondingly be provided to obtain a negative pressure.

The device of the present invention may finally also comprise open loop control, closed loop control and measuring units with appropriate sensors. The measuring units quantify the amount of segregated hydrogen and/or the proportion of hydrogen in the raw gas and the depleted raw gas and also further process parameters, such as temperature etc. The open and closed loop control units control the corresponding pressures for importing and exporting the various gases. The open and closed loop control units further allow control of the applied energy, for example the thermal energy and/or electric energy for heating the semipermeable material.

The device of the present invention may further be a device for obtaining high-purity hydrogen from raw gas with a first pressure vessel having outgoing lines for high-purity hydrogen, a second pressure vessel which resides in the inner region in the interior of the first pressure vessel and is self-contained with regard to the interior of the first pressure vessel, and this inner region is at least partially delimited from the interior of the first pressure vessel by a semipermeable material, wherein this semipermeable material is pervious to hydrogen, for segregating high-purity hydrogen from the raw gas, characterized in that the semipermeable material is a metal or metal alloy and is heatable, in particular by electric energy, at least segmentally, in particular as adapted for performing the method according to the present invention.

The semipermeable material may further be stimulated magnetically, for example by an alternating magnetic field. A person skilled in the art knows suitable means for applying the magnetic field.

The device may further include facilities for locally reducing the hydrogen concentrations on the semipermeable material.

Figure 2:
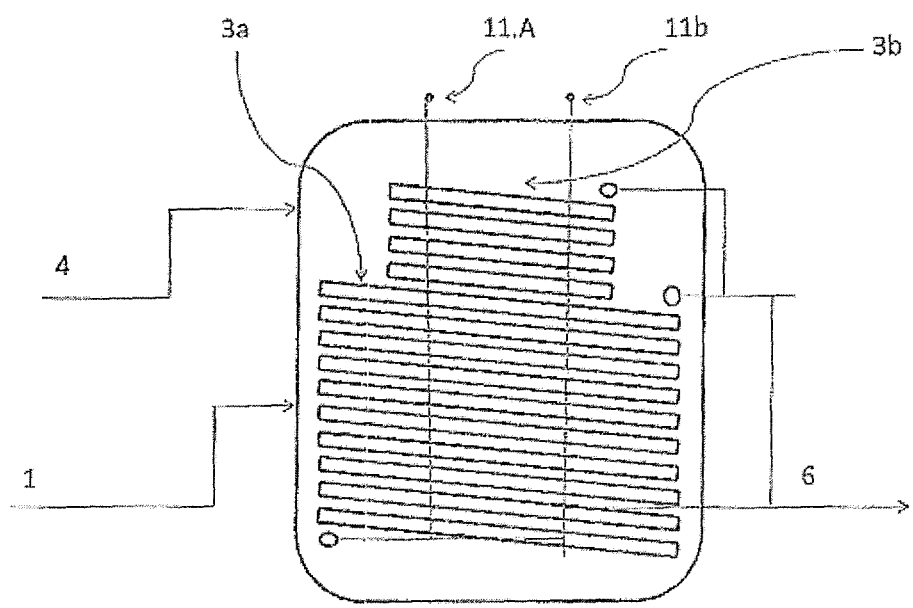
Figure 3:
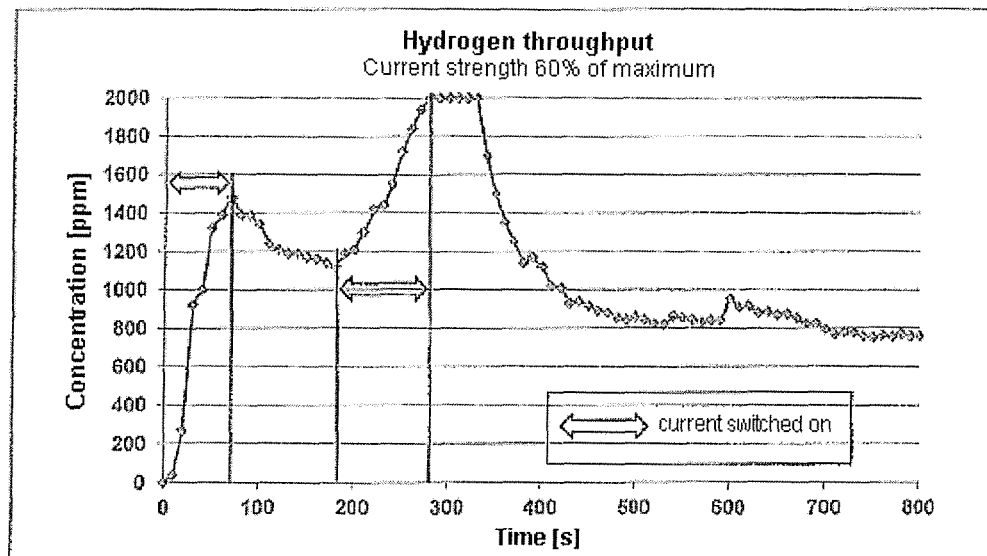
Figure 4:
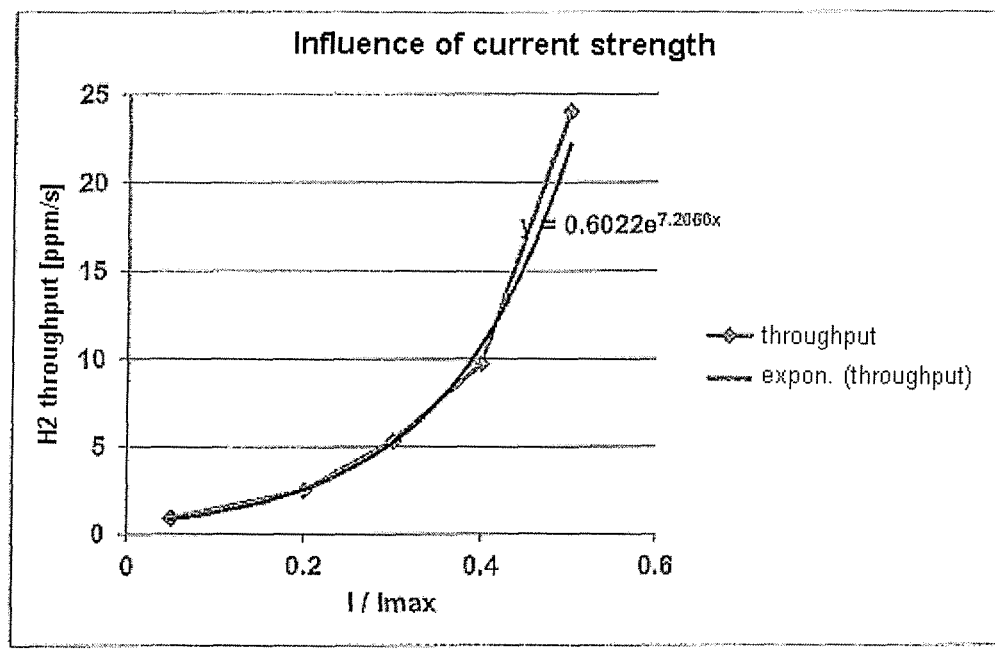

Preferred embodiments of the invention will now be more particularly described by way of example with reference to the drawings, in which FIG. 1 shows a schematic depiction of an inventive device, FIG. 2 shows a cross section through a pressure vessel containing two tubular coils comprising semipermeable material, FIG. 3 shows the concentration of $H_2$ as a function of time, and FIG. 4 shows the influence of current strength on $H_2$ enrichment.

REGARDING THE FIGURES IN DETAIL

FIG. 1 is a schematic drawing of an inventive device for purification of high-purity hydrogen. Pressure vessel 1 with interior 2 contains a self-contained inner region 3 comprising a semipermeable material in the interior 2. This inner region 3 is connected via electric contacts 11a and 11b to a current source 10. This inner region is further connected via the outlet 6 for the segregated hydrogen to a negative-pressure vessel 7. A vacuum pump 8 creates a negative pressure in the negative-pressure vessel 7 to withdraw the segregated hydrogen. In or at the pressure vessel or in other regions of the system for removing the segregated hydrogen, a sensor for quantifying the concentration of hydrogen 9 may be arranged in order to quantify the amount of segregated hydrogen. The inventive device may likewise include further sensors in the form of temperature sensors etc. in order to quantify the corresponding process parameters during the process. The corresponding process parameters which are picked up via the sensors are transmitted to the open and closed loop control units (not shown) for further processing. These open and closed loop control units are then able, via appropriate facilities, to control the pressure of the raw gas and of the depleted raw gas and of the segregated hydrogen, similarly the energy to be applied, for example the corresponding electric current, to control the process.

Depleted raw gas leaves pressure vessel 1 via outlet 5.

FIG. 2 depicts a cross section through a pressure vessel of an inventive device. In pressure vessel 1, raw gas is supplied via incoming line 4. An outer tube coil 3a and an inner tube coil 3b are shown; they constitute the inner region comprising semipermeable material. Electric contacts 11a and 11b make it possible to effect heating in a corresponding manner via suitable electric energy means.

The segregated hydrogen gas obtained is withdrawn via outgoing line 6 by means of negative pressure.

FIG. 3 shows the hydrogen concentration as a function of time and the energy supplied.

As becomes clear from the measurement, applying an electric current has the effect of increasing the perviousness of the semipermeable material rapidly and distinctly; the concentration of $H_2$ increases distinctly. By comparison, the concentration of $H_2$ only rises gradually without energy supply. Even about 300 seconds after the energy supply has been stopped, the concentration of $H_2$ in the segregated gas is distinctly elevated.

FIG. 4 depicts the influence of the current strength on applying electric energy. As can be seen, the throughput of hydrogen is exponentially proportional to the current strength applied.

LIST OF REFERENCE SIGNS

1 pressure vessel
2 interior
3, 3a, 3b inner region comprising semipermeable material
4 raw gas feed
5 raw gas outlet
6 hydrogen outlet
7 negative-pressure vessel
8 vacuum pump
9 $H_2$ measurement sensor
10 current source
11a/11b electric contacts

What is claimed is:

1. A method for obtaining high-purity hydrogen from a raw gas, wherein the raw gas is passed under pressure into a first pressure vessel and this first pressure vessel is at least partially delimited from a second pressure vessel by a semipermeable material and the first pressure vessel is completely self-contained relative to the second pressure vessel, wherein the high-purity hydrogen segregates through the semipermeable material into the second pressure vessel, and wherein the semipermeable material is a metal or metal alloy, the semipermeable material is heated at a start of the method at least, for a period sufficient to increase the amount of permeating hydrogen, and subsequently the heating is at least interrupted while continuing permeation of hydrogen from the raw gas through the semipermeable membrane, and wherein the semipermeable material comprises ferritic iron and/or pig iron and/or ingot iron.

2. The method for obtaining high-purity hydrogen from a raw gas as claimed in claim 1, wherein the first pressure vessel has an inner region, which forms the second pressure vessel and which is completely self-contained relative to the interior of the first pressure vessel, wherein the inner region is at least partially delimited from the interior of the first pressure vessel by the semipermeable material, and wherein the high-purity hydrogen segregates via the semipermeable material into the inner region.

3. The method as claimed in claim 1, wherein the semipermeable material is heated by means of current.

4. The method as claimed in claim 3, the current is an alternating current and is passed in a longitudinal direction through the semipermeable material at the start of the method at least.

5. The method as claimed in claim 3, wherein the heating is effected with an alternating current at a current density of at least 10 amperes per square millimeter.

6. The method as claimed in claim 1, wherein the raw gas is imported into the first pressure vessel in a mixture with a carrier gas.

7. The method as claimed in claim 2, wherein the hydrogen which segregates in the interior of the inner region is conducted away by negative pressure.

8. The method as claimed in claim 1, wherein the raw gas passes into the first pressure vessel at a temperature of below 400° C.

9. The method as claimed in claim 3, wherein the heating is effected with an alternating current in a pulsating manner.

10. The method as claimed claim 1, wherein the metal or metal alloy is or includes iron and the semipermeable material is subjected to an alternating current having a frequency of at least 50 Hz for a brief time at the start of the method and optionally again in the continued course.

11. A device for obtaining high-purity hydrogen from raw gas wherein the raw gas is passed under pressure into a first pressure vessel and this first pressure vessel is at least partially delimited from a second pressure vessel by a semipermeable material and the first pressure vessel is completely self-contained relative to the second pressure vessel, wherein the high-purity hydrogen segregates through the semipermeable material into the second pressure vessel, and wherein the semipermeable material is a metal or metal alloy, the device being configured such that the semipermeable material is heated at a start of the method at least, for a period sufficient to increase the amount of permeating hydrogen, and subsequently the heating is at least interrupted while continuing permeation of hydrogen from the raw gas through the semipermeable membrane, wherein the first pressure vessel includes incoming and outgoing lines for the raw gas and the hydrogen-depleted raw gas respectively, wherein the second pressure vessel, which is completely self-contained with regard to the first pressure vessel, and is at least partially delimited from the first pressure vessel by the semipermeable material, wherein the semipermeable material is pervious to hydrogen, for segregating high-purity hydrogen from the raw gas, and the semipermeable material is heatable, at least segmentally, and wherein the semipermeable material comprises ferritic iron and/or pig iron and/or ingot iron.

12. The device for obtaining high-purity hydrogen from raw gas as claimed in claim 11, wherein the second pressure vessel is in the form of an inner region in the interior of the first pressure vessel, said inner region being completely self-contained with regard to the interior of the first pressure vessel and being at least partially delimited from the interior of the first pressure vessel by the semipermeable material, wherein the semipermeable material is pervious to hydrogen.

13. The device for obtaining high-purity hydrogen from raw gas as claimed in claim 11, wherein the first pressure vessel includes outgoing lines for high-purity hydrogen, and wherein the second pressure vessel resides in inner region in the interior of the first pressure vessel and is self-contained relative to the interior of the first pressure vessel, and the inner region is at least partially delimited from the interior of the first pressure vessel by the semipermeable material, wherein the semipermeable material is pervious to hydrogen, for segregating high-purity hydrogen from the raw gas.

14. The method for obtaining high-purity hydrogen from a raw gas as claimed in claim 1, wherein the raw gas passes under pressure into an inner region of the first pressure vessel, wherein the inner region is completely self-contained relative to an interior of the first pressure vessel and is at least partially delimited from the interior of the first pressure vessel by the semipermeable membrane and wherein the high-purity hydrogen is segregated into the first pressure vessel via the semipermeable membrane.

* * * * *